(12) United States Patent
Jayasuriya et al.

(10) Patent No.: US 9,446,735 B1
(45) Date of Patent: Sep. 20, 2016

(54) VEHICLE IMPACT ABSORBING SYSTEM

(71) Applicant: Ford Global Technologies, LLC, Dearborn, MI (US)

(72) Inventors: Mangala A. Jayasuriya, Bloomfield Hills, MI (US); Robert William McCoy, Ann Arbor, MI (US); James Chih Cheng, Troy, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 14/673,935

(22) Filed: Mar. 31, 2015

(51) Int. Cl.
| | |
|---|---|
| B60R 21/16 | (2006.01) |
| B60R 21/232 | (2011.01) |
| B60R 21/213 | (2011.01) |
| B60R 21/01 | (2006.01) |
| B60R 21/233 | (2006.01) |

(52) U.S. Cl.
CPC .............. *B60R 21/232* (2013.01); *B60R 21/01* (2013.01); *B60R 21/213* (2013.01); *B60R 21/233* (2013.01)

(58) Field of Classification Search
CPC .............. B60R 21/213; B60R 21/214; B60R 2021/23123; B60R 2021/23192; B60R 21/232
USPC .................................. 280/728.2, 730.2, 735
See application file for complete search history.

(56) References Cited

U.S. PATENT DOCUMENTS

| | | | |
|---|---|---|---|
| 5,470,103 A | 11/1995 | Vaillancourt et al. | |
| 5,599,042 A | 2/1997 | Shyr | |
| 5,988,735 A * | 11/1999 | Muller ................ | B60R 13/0225 280/728.2 |
| 6,073,960 A * | 6/2000 | Viano ................... | B60R 21/231 280/730.1 |
| 6,189,960 B1 * | 2/2001 | Mumura ................ | B60J 7/0015 160/7 |
| 6,224,088 B1 | 5/2001 | Lohavanijaya | |
| 6,457,740 B1 * | 10/2002 | Vaidyaraman ........ | B60R 21/231 280/730.2 |
| 6,808,198 B2 * | 10/2004 | Schneider ............. | B60R 21/237 280/730.1 |
| 6,817,626 B2 | 11/2004 | Boll et al. | |
| 6,913,280 B2 * | 7/2005 | Dominissini ......... | B60R 21/213 280/728.2 |
| 7,000,944 B2 | 2/2006 | Bakhsh et al. | |
| 7,185,913 B2 * | 3/2007 | Bakhsh ................... | B60R 21/02 280/730.1 |
| 7,195,276 B2 * | 3/2007 | Higuchi ................ | B60R 21/231 280/729 |
| 7,393,006 B2 | 7/2008 | Ohrvall et al. | |
| 7,690,684 B2 * | 4/2010 | Tobaru ................... | B60R 21/13 280/730.1 |
| 7,762,579 B2 * | 7/2010 | Garner ................... | B60R 21/08 280/730.2 |
| 8,328,228 B2 | 12/2012 | Lee et al. | |
| 9,073,574 B2 * | 7/2015 | Cuddihy ................ | B62D 1/183 |
| 9,108,584 B2 * | 8/2015 | Rao ....................... | B60R 21/017 |
| 2006/0202452 A1 | 9/2006 | Breed et al. | |

FOREIGN PATENT DOCUMENTS

| | | |
|---|---|---|
| DE | 10115064 | 11/2002 |
| JP | 2006219044 | 8/2006 |

* cited by examiner

*Primary Examiner* — Toan To
(74) *Attorney, Agent, or Firm* — Frank A. MacKenzie; Bejin Bieneman PLC

(57) ABSTRACT

A vehicle includes an instrument panel, a front airbag, a first side curtain airbag, and a second side curtain airbag and two front seats. The front seats are disposed between the first side curtain airbag and the second side curtain airbag. The vehicle includes a roof, and the front airbag is supported by the roof. The front airbag extends from the first side curtain airbag to the second side curtain airbag between the instrument panel and the front seats to absorb energy from occupants during an impact event to reduce the likelihood of head injury and to urge the occupants to remain seated in an upright position to reduce chest loading by seat belts. The front airbag may protect an unbelted occupant ejecting out of the vehicle through a windshield in a crash event.

20 Claims, 9 Drawing Sheets

VEHICLE IMPACT ABSORBING SYSTEM

BACKGROUND

An interior of a vehicle, such as automobile, typically includes various safety devices for absorbing energy from an occupant of the vehicle during an impact of the vehicle. For example, the vehicle may include an airbag affixed in a steering wheel or an instrument panel. The airbag may be configured to absorb energy and soften impact between the body of the occupant and the steering wheel or the instrument panel.

Automobiles are subject to a variety of crash tests, including standard tests regulated by the National Highway Traffic Safety Administration (NHTSA). For example, these tests may be directed toward oblique impacts, i.e., impacts that occur at an angle of 10-50 degrees relative to a vehicle's trajectory. During the oblique impact, the occupant may move forward and laterally, and a seat belt may impart a load onto a chest of the occupant.

Several types of information are measured during the oblique crash test, including airbag performance, test dummy reaction, etc. One type of measurement is the Brain Injury Criteria (BrIC) values during the oblique impact. The BrIC values characterize occupant movement in particular angular velocities of the head. Occupants may move toward a vehicle pillar, e.g., an A-pillar, or toward the center of an instrument panel. There remains an opportunity to design an energy absorber to slow occupant movement in various frontal crashes, including oblique impacts, and reduce loading on the chest of the occupant from the seat belt.

DETAILED DESCRIPTION

Figure 1:
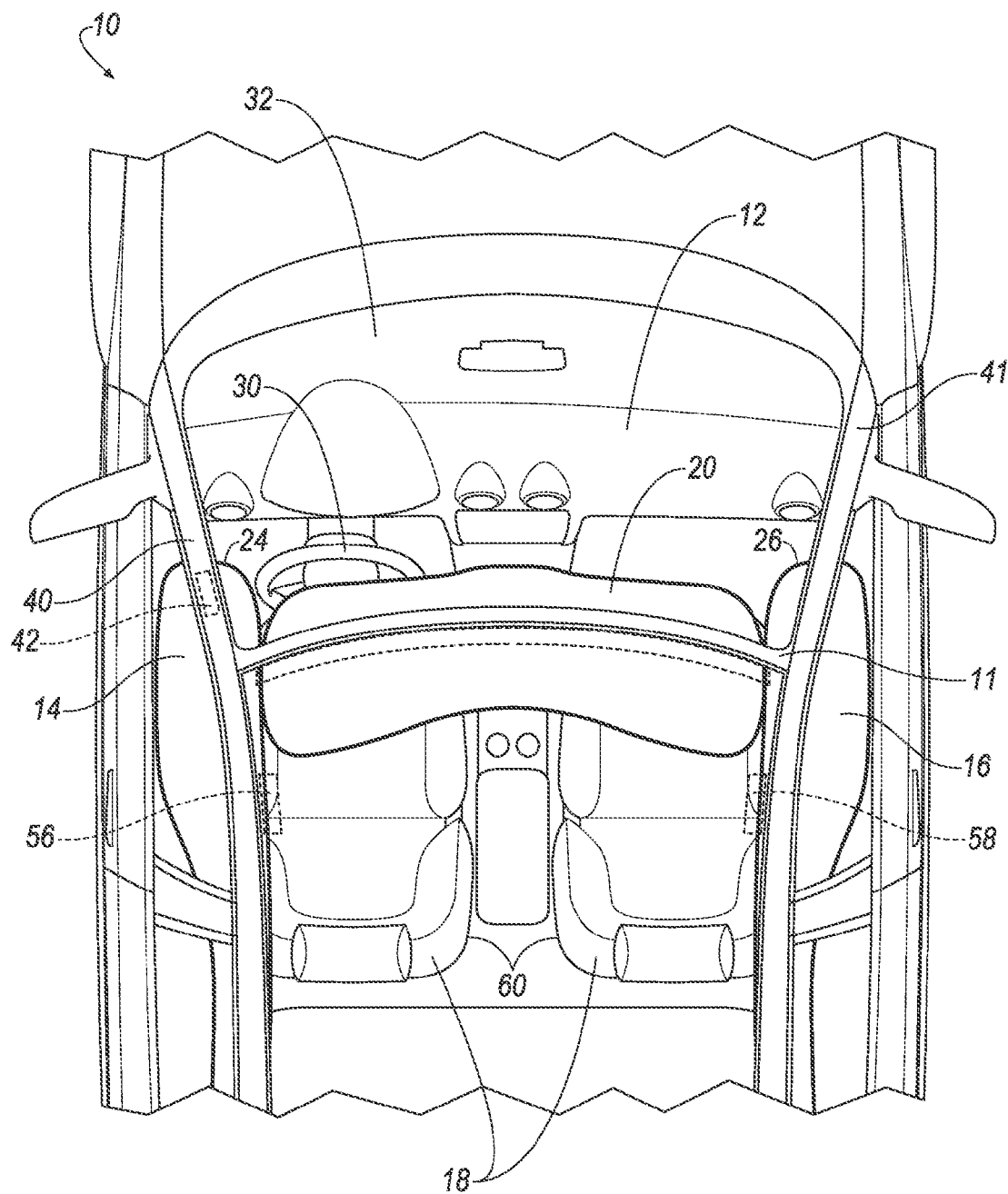
FIG. 1 is a plan view of a vehicle with a front airbag.

With reference to the Figures, wherein like numerals indicate like parts throughout the several views, a vehicle 10 includes an instrument panel 12, a first side curtain airbag 14, and a second side curtain airbag 16, as shown in FIG. 1. The vehicle 10 includes two front seats 18 disposed between the first side curtain airbag 14 and the second side curtain airbag 16. A front airbag 20 extends from the first side curtain airbag 14 to the second side curtain airbag 16 between the instrument panel 12 and the front seats 18. The vehicle 10 includes a roof 11, and the front airbag 20 is supported by the roof 11.

Figure 2:
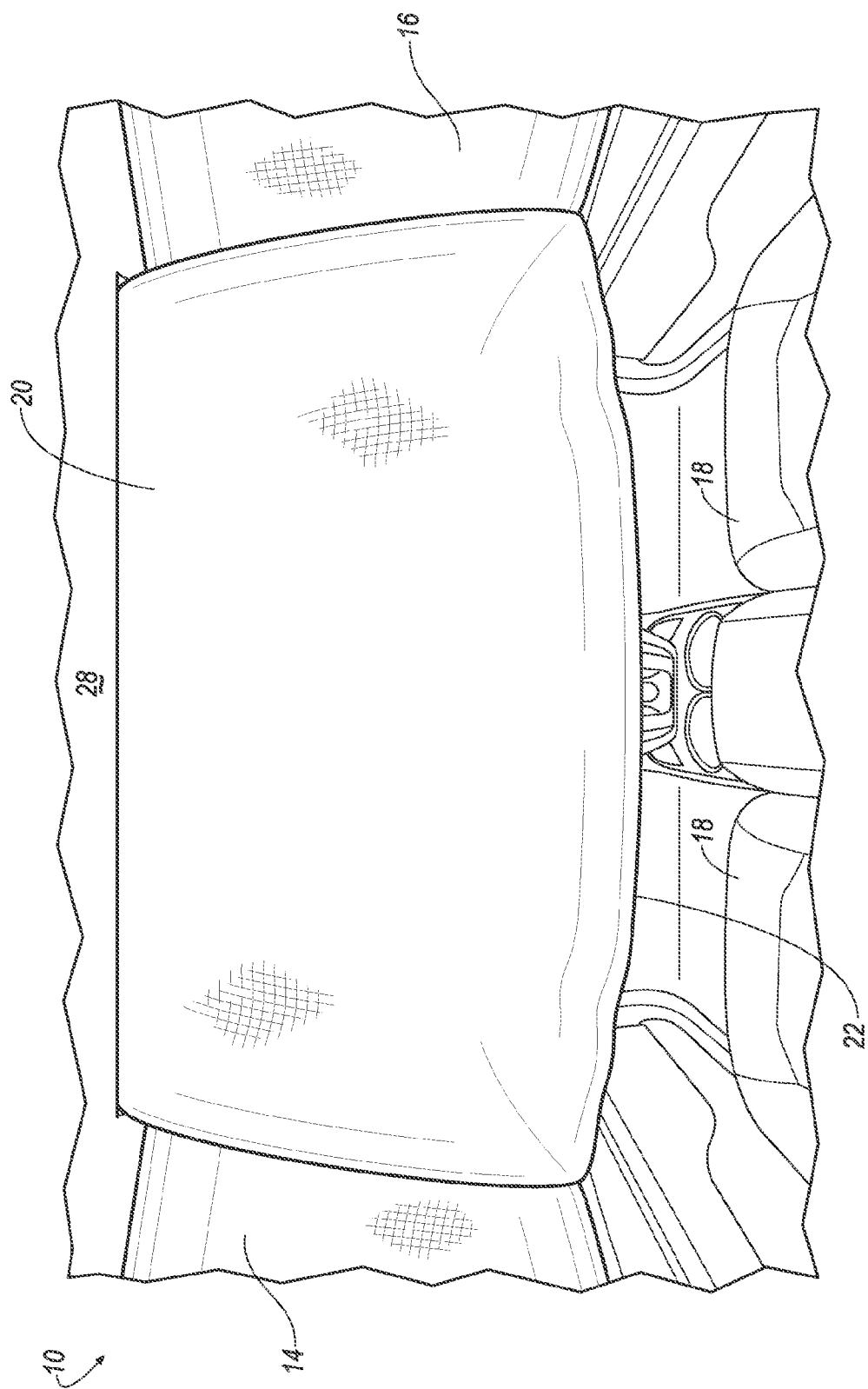
FIG. 2 is a forward-facing view of the vehicle with the front airbag extending between a first side curtain airbag and a second side curtain airbag.

With reference to FIGS. 1 and 2, the front airbag 20 may absorb energy from vehicle occupants during an impact event. Because the front airbag 20 extends from the first side curtain airbag 14 to the second side curtain airbag 16, the front airbag 20 absorbs energy from vehicle occupants, e.g. a driver and a passenger, from a variety of impact scenarios, e.g., frontal impacts, side impacts, and oblique impacts.

By effectively enclosing the occupants between the front airbag 20 and the first and second side curtain airbags 14, 16, occupant impact energy is absorbed from several directions. For example, in an oblique impact, the momentum of the vehicle occupants may move the driver toward a vehicle pillar 40, e.g., an A-pillar, and the passenger may move toward the center of the instrument panel 12, as shown in FIG. 1. The intersection of the first side curtain airbag 14 and the front airbag 20 absorbs the impact energy from the driver during the oblique impact. Furthermore, in an oblique impact the driver may move toward the center of the instrument panel 12, and the front seat passenger may move toward a vehicle pillar 41, e.g., an A-pillar.

During the oblique impact, a seat belt may impart a load onto a chest of one of the occupants. Because the front airbag 20 extends between the instrument panel 12 and the front seats 18, the front airbag 20 may urge the occupants to remain upright during the impact event, reducing loading on the chest of the occupant from the seat belt. As shown in FIGS. 2-5, the vehicle 10 may include a headliner 28. The headliner 28 is disposed above the front seats 18. The headliner 28 may be of any suitable construction and may be formed of any suitable material, e.g., foam, thermoplastic, and/or other polymeric material. The front airbag 20 may extend from the headliner 28. The first and second side curtain airbags 14, 16 may extend from the side roof rails (not shown) and through the headliner 28.

The front airbag 20 may be supported by the roof 11, as shown in FIG. 1. Specifically, the front airbag 20 may be mounted to a roof header. The front airbag 20 may be supported by the roof 11 in any suitable manner, e.g., fastened directly to the roof header, disposed between the roof 11 and the headliner 28, etc.

The vehicle 10 may include the vehicle pillars 40 and 41. The vehicle pillar 40 may be disposed adjacent to the instrument panel 12 and may extend toward the headliner 28.

The vehicle 10 may include a front airbag module including the front airbag 20 and an inflator 42. The inflator 42 may be in communication with the front airbag 20 to inflate the front airbag 20 from an uninflated position to an inflated position during the impact event. The front airbag 20 may be constructed of any suitable material, e.g. nylon 6,6.

Figure 6:
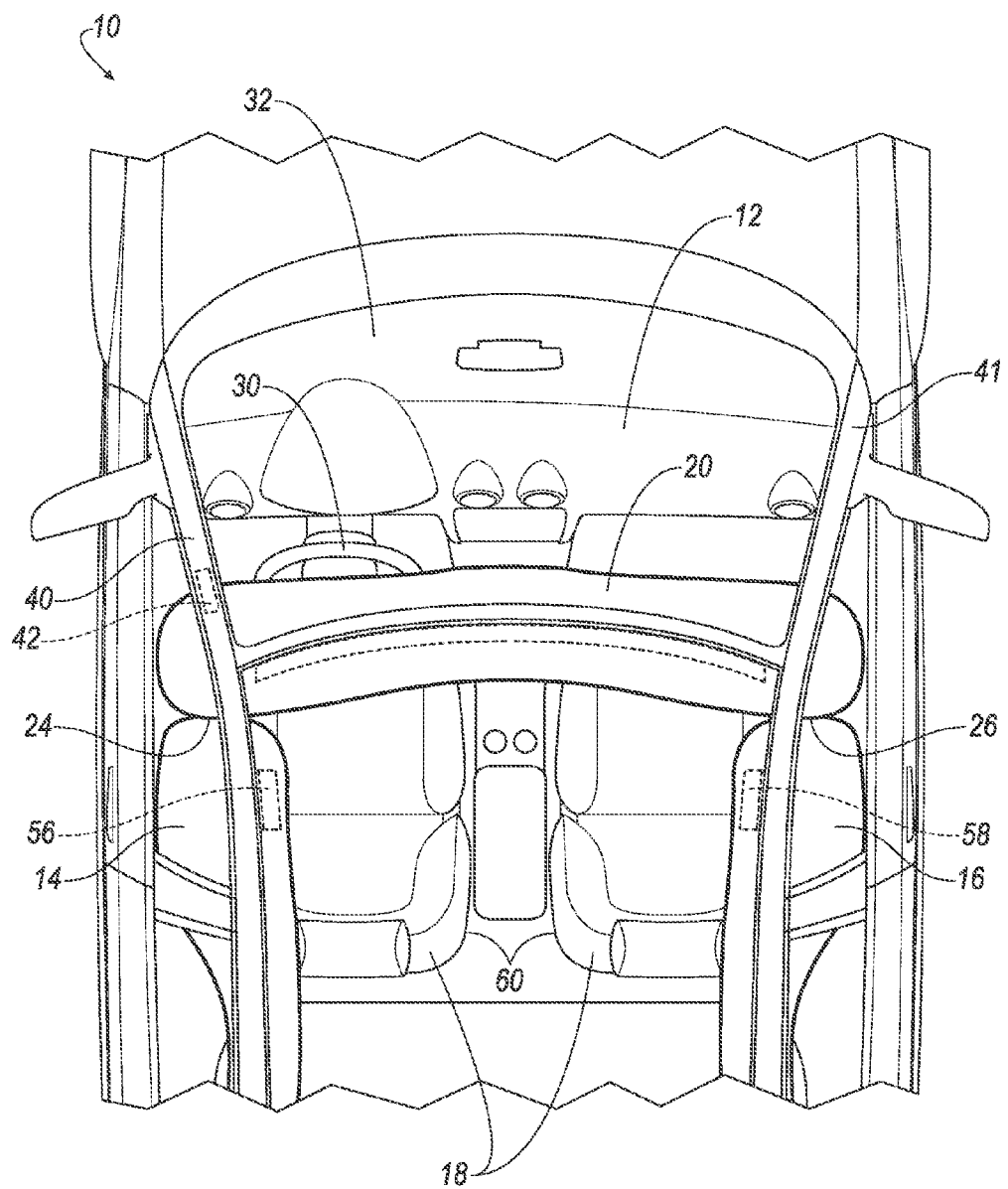
FIG. 6 is a plan view of the vehicle with the front airbag extending between an instrument panel and the first and second side curtain airbags.

As shown in FIGS. 1 and 6, the inflator 42 may be disposed, for example, in the vehicle pillar 40, 41. Alternatively, the inflator 42 may be disposed in the headliner 28, mounted to the roof 11, e.g. the roof header, or disposed in any other suitable location. The inflator 42 may be fluidly connected to the front airbag 20 in any suitable way. The inflator 42 may be of any suitable type, e.g., a cold gas inflator. In the uninflated position, the front airbag 20 may be entirely disposed in the headliner 28. During the impact event, the front airbag 20 may extend out of the headliner 28 in any suitable manner, e.g., through a frangibly connected panel, a frangible seam, etc.

The front airbag 20 may include a bottom edge 22, as shown in FIGS. 2-5. The bottom edge 22 is defined as the portion of the front airbag 20 farthest from the headliner 28 in a vertical direction when the front airbag 20 is in the inflated position. The bottom edge 22 may extend blow the steering wheel to provide protection to the occupant chest area and control forward movement of the torso and hip. Depending on the size, number of chambers, tethering pattern; inflation and venting characteristics of the front airbag 20, the deployed size and coverage area may be modified to allow customization of the energy absorbing characteristics of the front airbag 20 during the impact event.

The vehicle 10 may include a first curtain module including the first side curtain airbag 14 and an inflator 56 and a second curtain module including the second side curtain airbag 16 and an inflator 58. The first curtain module and the second curtain module may be supported by the roof 11, e.g., by the roof header. For example, the inflators 56, 58 and/or the first and second side curtain airbags 14, 16 may be mounted to the roof. Alternatively, the inflators 56, 58 may be disposed in any suitable location, e.g., disposed in the vehicle pillar 40, the headliner 28, etc.

The inflator 56 may be in communication with the first side curtain airbag 14 to inflate the first side curtain airbag 14 from an uninflated position to an inflated position. The inflator 58 may be in communication with the second side curtain airbag 16 to inflate the second side curtain airbag 16 from an uninflated position to an inflated position. The inflators 56, 58 may be of any suitable type, e.g., a cold gas inflator.

The first side curtain airbag 14 may extend along a driver side front door of the vehicle 10 in the inflated position and the second side curtain airbag 16 may extend along a passenger side front door of the vehicle 10 in the inflated position. The first and second side curtain airbags 14, 16 are spaced from each other when in the inflated position. The first side curtain airbag 14 and the second side curtain airbag 16 may absorb energy from the vehicle occupants during the impact event. As shown in FIGS. 1, 2, and 6, the first and second side curtain airbags 14, 16 may be disposed to receive the lateral movement of the occupants in the inflated position. In the uninflated position, the first and second side curtain airbags 14, 16 may be disposed in the headliner 28. During the impact event, the first side curtain airbag 14 and the second side curtain airbag 16 may extend out of the headliner 28 in any suitable manner, e.g., through a frangibly connected panel, a frangible seam, etc. The first and second side curtain airbags 14, 16 may be constructed of any suitable material, e.g. nylon 6,6.

As set forth above, the front airbag 20 may contact the first side curtain airbag 14 and the second side curtain airbag 16, as shown in FIGS. 1 and 6. Specifically, the front airbag 20 may extend from the first side curtain airbag 14 to the second side curtain airbag 16. Contacting the first side curtain airbag 14 and the second side curtain airbag 16 allows the front airbag 20 and the first side curtain airbag 14 to receive occupants and absorb occupant impact energy from several directions. One embodiment of the front airbag 20 and the first and second side curtain airbags 14, 16 is shown in FIG. 1, and another embodiment is shown in FIG. 6. In the embodiment of FIG. 1, the first side curtain airbag 14 is disposed between the front airbag 20 and a left door of the vehicle 10 and the second side curtain airbag 16 is disposed between the front airbag 20 and a right door of the vehicle 10. In other words, an end 24 of the first side curtain airbag 14 and an end 26 of the second side curtain airbag 16 are disposed forward of the front airbag 20.

In the embodiment of the front airbag 20 and the first and second side curtain airbags 14, 16 shown in FIG. 6, the front airbag 20 may extend between the end 24 of the first side curtain airbag 14 and the instrument panel 12. The second side curtain airbag 16 may similarly have an end 26 proximal to the instrument panel 12, as shown in FIG. 6, and the front airbag 20 may extend between the end 26 of the second side curtain airbag 16 and the instrument panel 12. The bottom edge 22 of the front airbag 20 may extend from the end 24 of the first side curtain airbag 14 to the end 26 of the second side curtain airbag 16.

Figure 3:
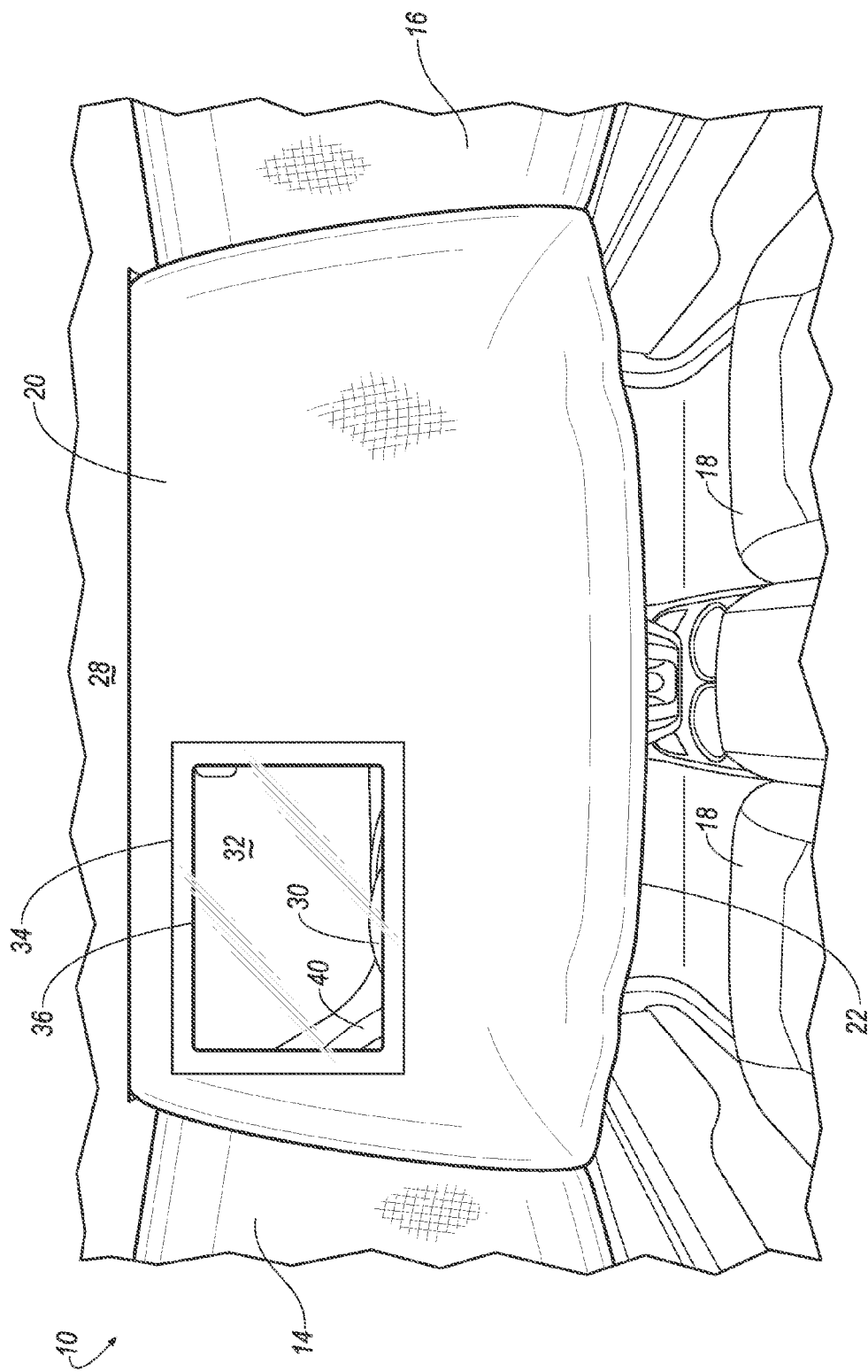
FIG. 3 is a forward-facing view of the vehicle with the front airbag having an opening and a transparent panel covering the opening.
Figure 4:
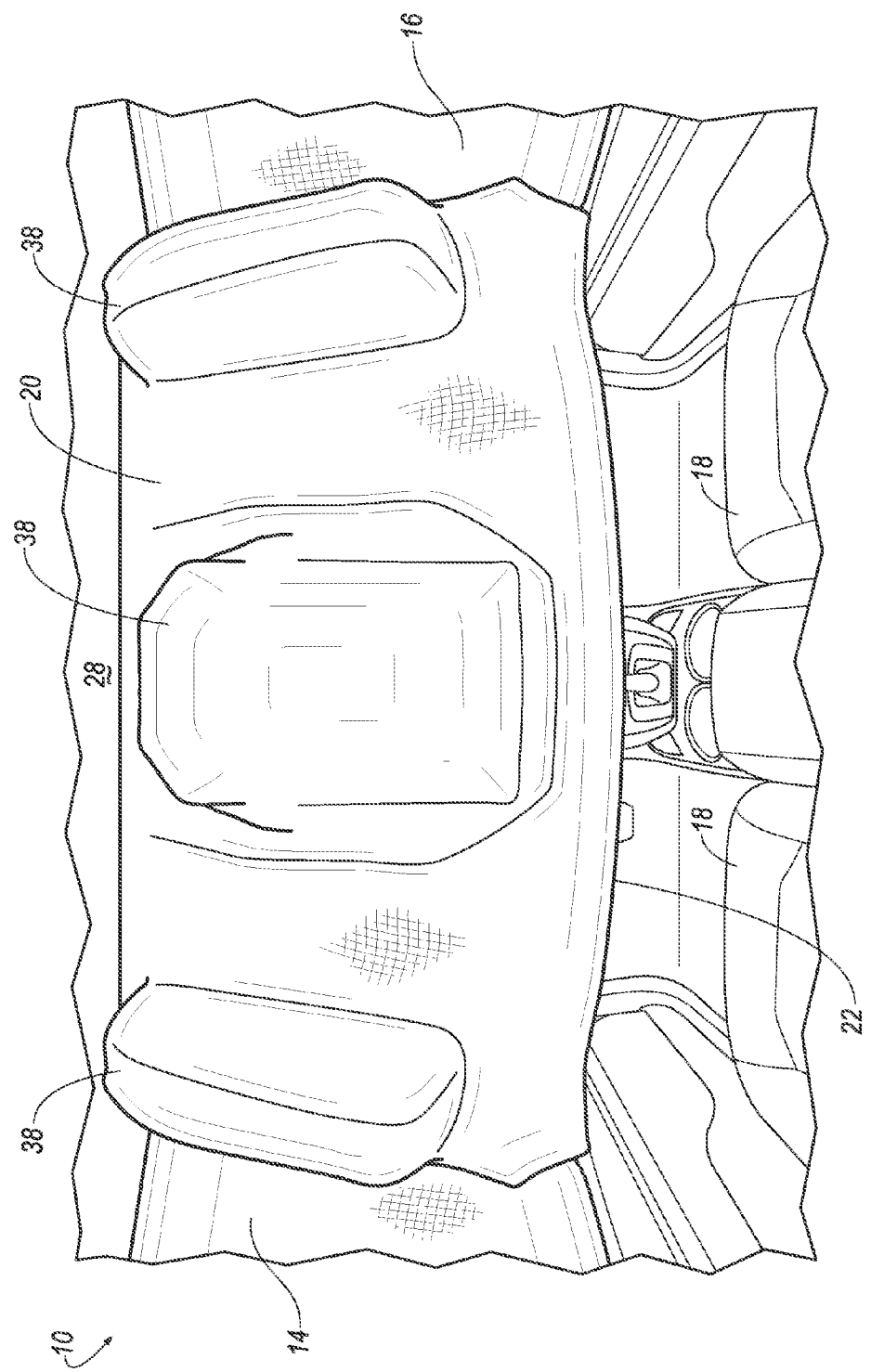
FIG. 4 is a forward-facing view of the vehicle where the front airbag has inflatable protruded chambers.

The vehicle 10 may include a steering wheel 30, as shown in FIGS. 1, 3, 5, and 6. The front airbag 20 may extend between the steering wheel 30 and the front seats 18 to receive the driver during the impact event. Specifically, the front seats 18 may each have a seat back 60, and the front airbag 20 may extend between the steering wheel 30 and the seat backs 60, as shown in FIGS. 1 and 6. As shown in FIGS. 2-4, the bottom edge 22 of the front airbag 20 may be disposed below the steering wheel 30 in a vertical direction relative to the headliner 28, such that the steering wheel 30 may be entirely disposed between the instrument panel 12 and the front airbag 20. Alternatively, the bottom edge 22 of the front airbag 20 may extend across the steering wheel 30.

The steering wheel 30 may retract along a steering column (not shown) and may be movable from a deployed position to a stowed position. In the deployed position, the front airbag 20 may be disposed between the steering wheel 30 and the front seats 18. In the stowed position, the steering wheel 30 may be retracted along the steering column and moved beneath the instrument panel 12. The steering wheel 30 may be moved to the stowed position in, e.g., an autonomous driving mode.

The deployment and venting characteristics of the front airbag 20 may be varied based on the size of the occupants, seating position and crash mode. For example a larger occupant seated with the seat moved rearward may have a longer duration and late venting to keeping the pressure inside the bag relatively high compared to a small occupant seated close to the steering wheel may require a softer bag with faster deployment timing.

The vehicle 10 may include a windshield 32, as shown in FIGS. 1, 3, and 6. The front airbag 20 may include a transparent panel 34, as shown in FIG. 3 to allow the driver to view the windshield 32 through the transparent panel 34. In other words, the front airbag 20 may define an opening 36 and the transparent panel 34 may cover the opening 36. The opening 36 may be rectangular or any other shape and size. The transparent panel 34 may be constructed of any suitable material, e.g., transparent nylon 6,6 or other transparent polymeric material. The opening 36 and the transparent panel 34 may be disposed above the steering wheel 30 to allow the driver to see through the windshield 32. The front airbag 20 may include additional transparent panels (not shown) covering an additional opening (not shown). The transparent panel 34 may be attached to the front airbag 20 in any suitable manner, e.g., stitching, adhesives, fusing, etc.

Figure 5:
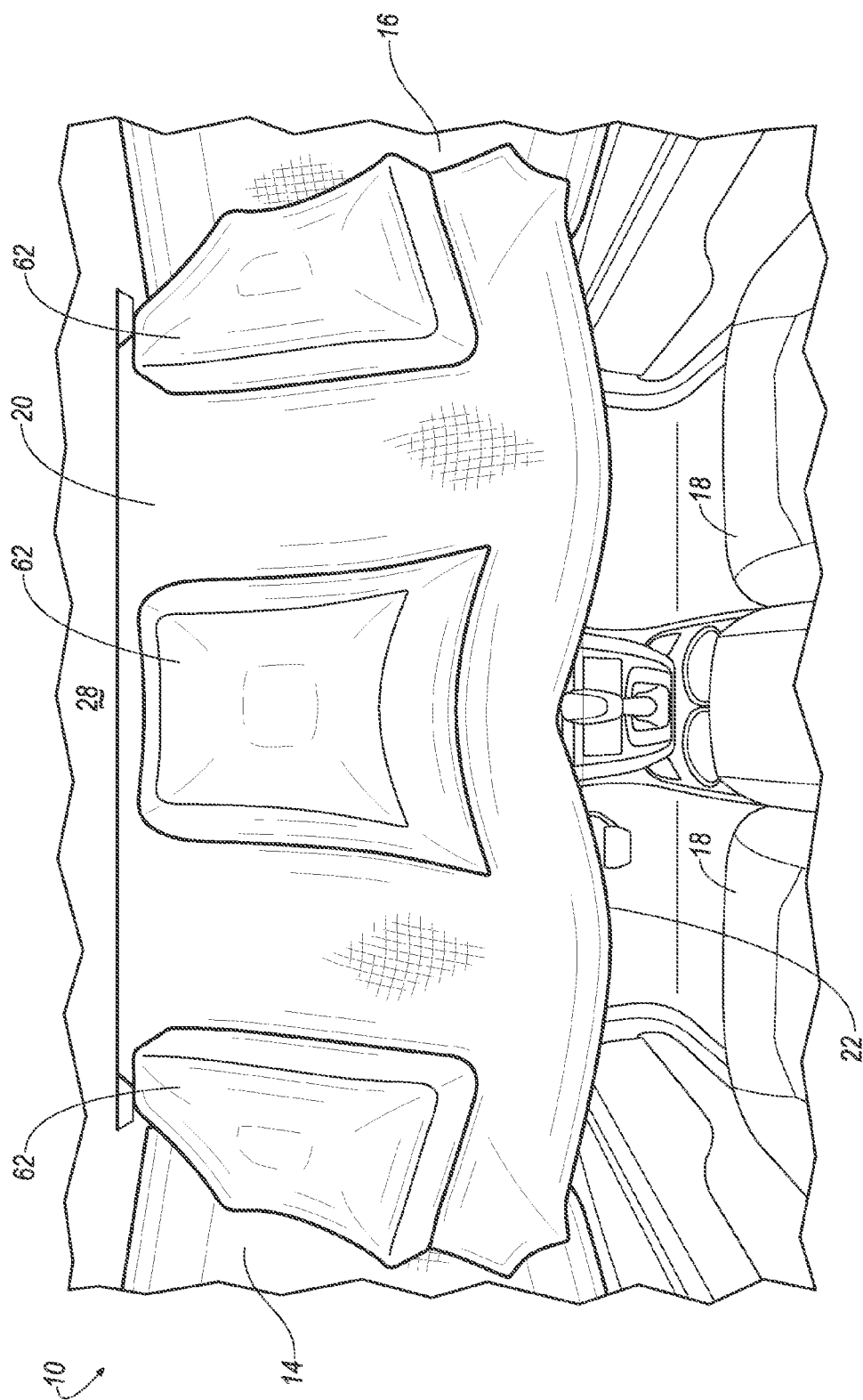
FIG. 5 is a forward-facing view of the vehicle where the front airbag has inflatable protruded chambers separately connected to the front airbag.

The front airbag 20 may include at least one protruded chamber 38. For example, the protruded chamber 38 may be inflatable portions of the front airbag 20 extending toward the front seats 18, as shown in FIG. 4. In another example, the protruded chamber 62 may be separately connected to the rest of the front airbag 20, as shown in FIG. 5. As shown in FIGS. 4-5, the front airbag 20 may include a plurality of protruded chambers 38, 62 disposed to absorb occupant impact energy from several directions. During the oblique impact event, the protruded chamber 38 adjacent to the first side curtain airbag 14 may receive the driver, while the protruded chamber 38 adjacent to the center of the instrument panel 12 may receive the passenger.

During an oblique impact, front seat occupants (the driver and the front passenger) may move forward and laterally such that their heads may contact the front airbag 20 before significantly increasing the head rotational speeds. The front airbag 20 absorbs energy from the moving head while the protruded chambers 38, 62 restrain rotation of the head. Furthermore, the front airbag 20 may assist in retaining an unbelted occupant in the vehicle 10.

Figure 7:
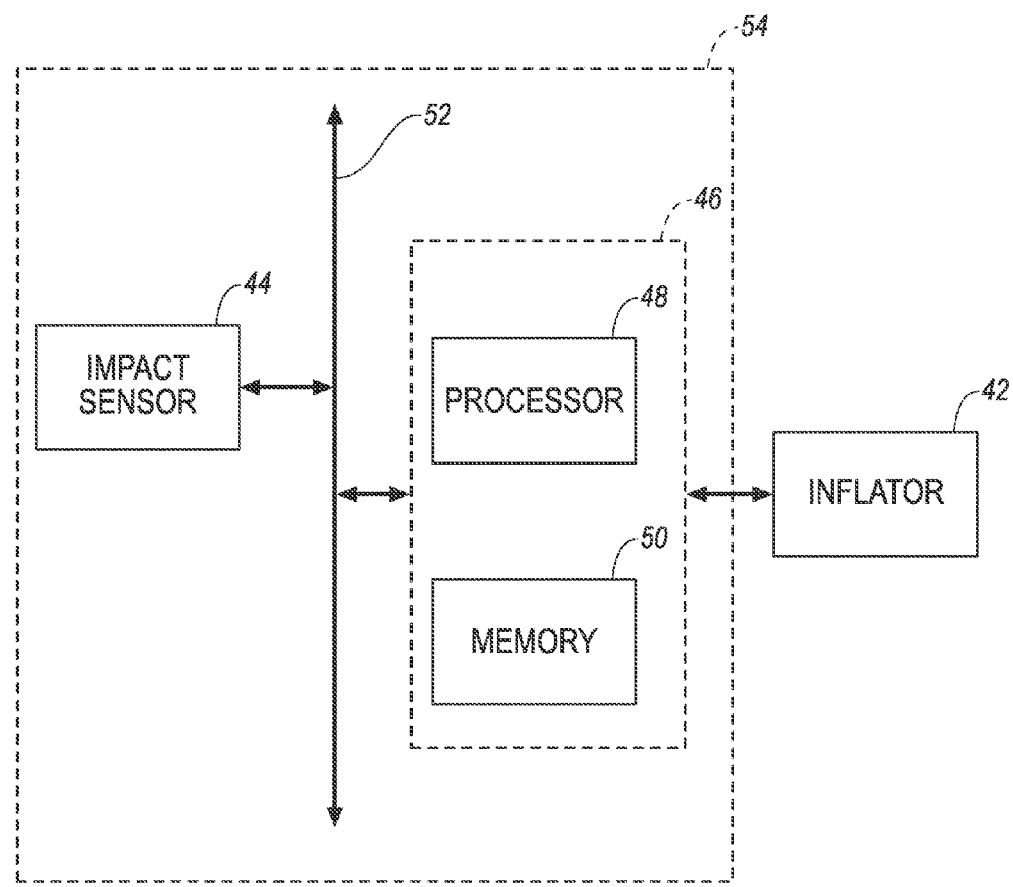
FIG. 7 is a block diagram of an inflator and an impact sensing system.

The vehicle 10 may include decision-making electronics, algorithms and a mechanism (not shown) for selectively releasing the protruded chamber 38. For example, the mechanism may be a frangible tether (not shown). The frangible tether may be connected to the protruded chamber 38 such that when the oblique impact is detected, the tether breaks, allowing the protruded chamber 38 to extend toward the front seats 18 and receive the occupant. The tether may be connected to the protruded chamber 38 from inside the front airbag 20, or may be connected along the outside surface of the front airbag 20. With reference to FIG. 7, the vehicle 10 may include an impact sensing system 54. The impact sensing system 54 may include an impact sensor 44 and a controller 46. The controller 46 is in communication with the inflator 42 and may include a processor 48 and a memory 50. The memory 50 stores instructions executable by the processor 48 to control the inflator 42. The controller 46 may be programmed to, upon identification of an impact, cause triggering of the inflator 42, extending the front airbag 20.

The impact sensor 44 may be in communication with the controller 46 to communicate data to the controller 46. The impact sensor 44 may be of any suitable type, e.g., using accelerometers, radar, lidar, and/or a vision system. The vision system may include one or more cameras, CCD image sensors, and/or CMOS image sensors, etc. Based on data communicated by the impact sensor 44, the controller 46 may cause triggering the inflator 42.

Communications between the controller 46, the impact sensor 44, the inflator 42, and/or other components in the vehicle 10, may be connected to a communication bus 52, such as a controller area network (CAN) bus, of the vehicle 10. The controller 46 may use information from the communication bus 52 to control the triggering of the inflator 42. The inflator 42 may be connected to the controller 46 or may be connected to the communication bus 52.

Figure 8:
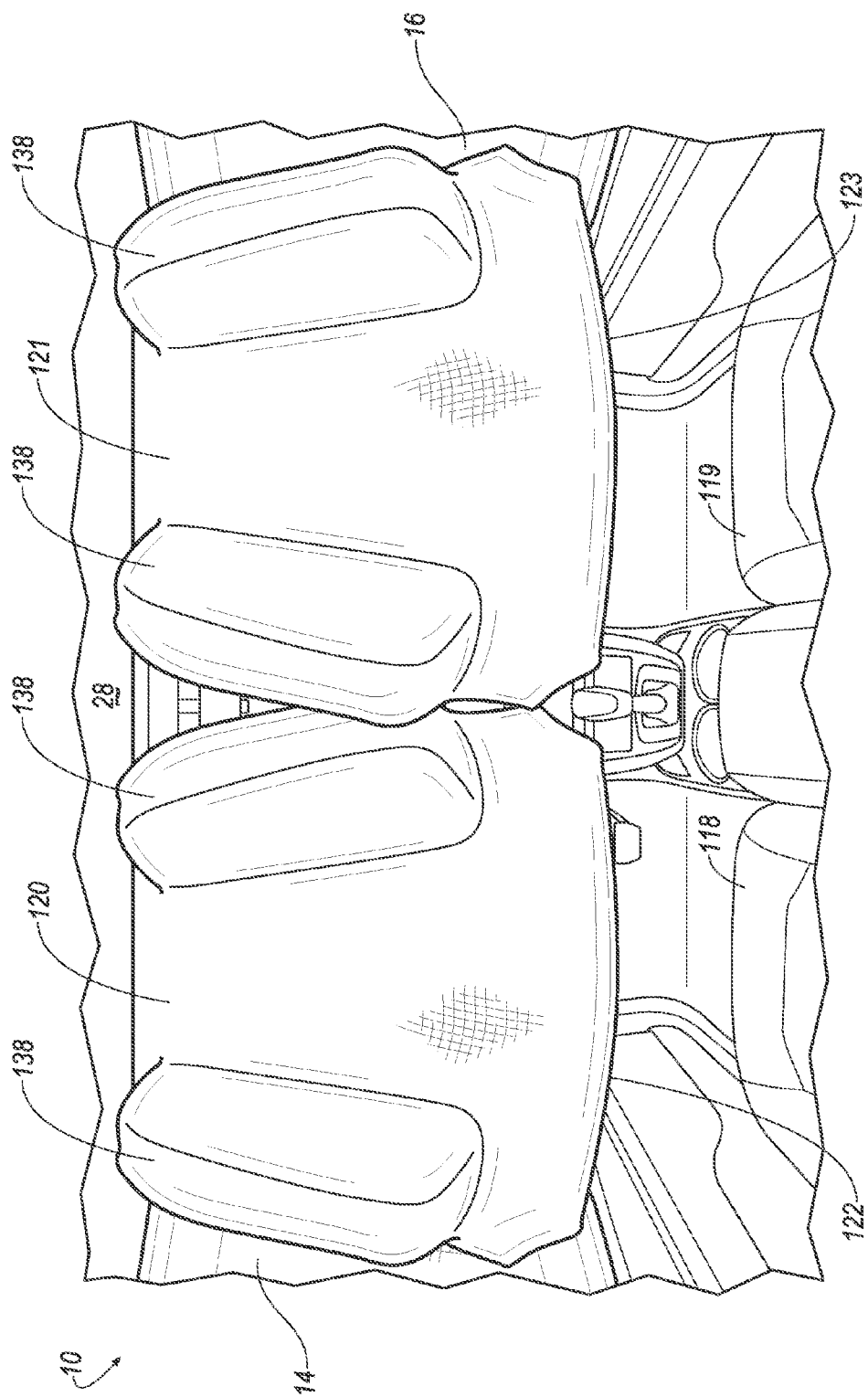
FIG. 8 is a forward-facing view of the vehicle including a first front airbag and a second front airbag.

In another example shown in FIG. 8, the vehicle 10 may include a first front airbag 120 and a second front airbag 121. The first front airbag 120 may extend from the headliner 28 adjacent the first side curtain airbag 14, and the second front airbag 121 may extend from the headliner 28 adjacent the second side curtain airbag 16. The first and second front airbags 120, 121 may be supported by the roof 11 shown in FIG. 1. The inflator 42 may be fluidly connected to the first front airbag 120 to inflate the first front airbag 120 from an uninflated position to an inflated position, and a second inflator (not shown) may be fluidly connected to the second front airbag 121 to inflate the second front airbag 121 from an uninflated position to an inflated position. The first front airbag 120 may abut the second front airbag 121 near the center of the instrument panel 12 when the first and second front airbags 120, 121 are in the inflated position.

The vehicle 10 may include a first front seat 118 and a second front seat 119. The first and second front seats 118, 119 may be disposed between the first and second side curtain airbags 14, 16. The first front airbag 120 may be disposed between the steering wheel 30 and the first front seat 118, and the second front airbag 121 may be disposed between the instrument panel 12 and the second front seat 119. The first front airbag 120 may have a bottom edge 122 that extends below the steering wheel 30. The second front airbag 121 may have a bottom edge 123. In an oblique impact, the second front airbag 121 may selectively deploy depending on several conditions, e.g., whether the second front seat 119 is occupied.

The first and second front airbags 120, 121 may include inflatable protruded chambers 138, as shown in FIG. 8. The protruded chambers 138 may be inflatable portions of the first and second front airbags 120, 121 extending toward the first and second front seats 118, 119, or may be separately connected (not shown) to the rest of the first and second front airbags 120, 121. When the protruded chambers 138 extend toward the first and second front seats 118, 119, the protruded chambers 138 may receive occupants during, e.g., an oblique impact. In addition, the protruded chambers 138 may extend toward the windshield 32. The windshield 32 may support the first and second front airbags 120, 121 during the impact event. Specifically, the windshield 32 may act as a reaction surface to maintain the position of the first and second front airbags 120, 121 relative to the windshield 32 during the impact event.

Figure 9:
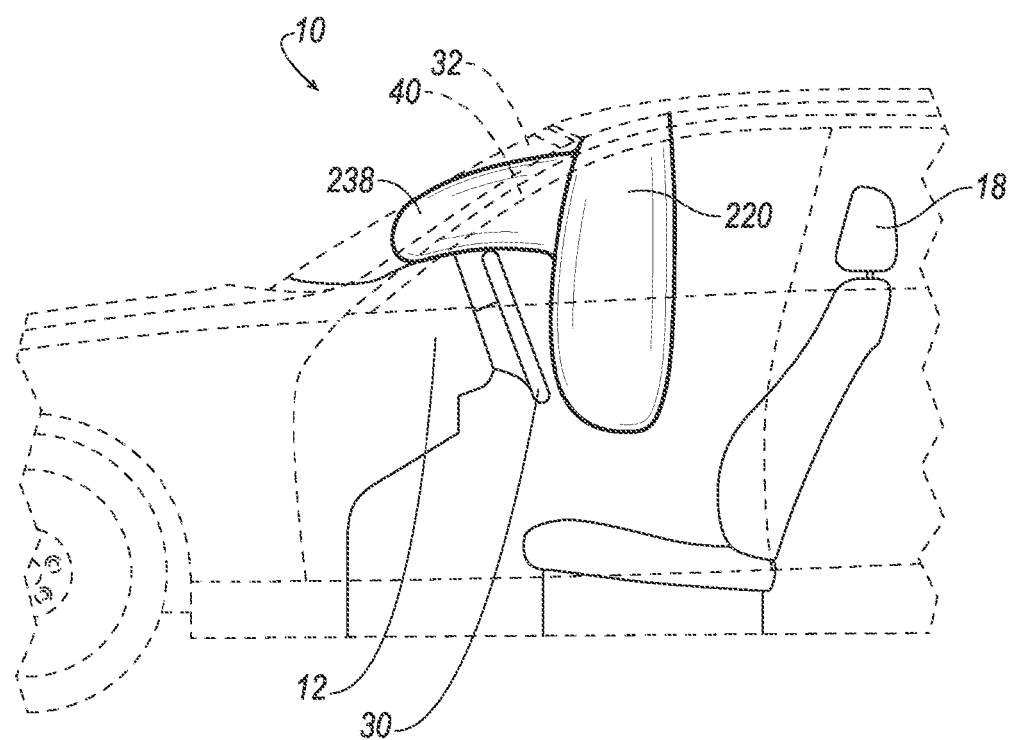
FIG. 9 is a side view of the vehicle where the front airbag has inflatable protruded chambers extending toward a windshield.

FIG. 9 shows a second embodiment of a front airbag 220. Common elements from FIGS. 1-7 are shown with common numerals. The front airbag 220 may include protruded chambers 238 extending toward the windshield 32. The windshield 32 may support the front airbag 220 during the impact event. In other words, the windshield 32 may act as a reaction surface to maintain the position of the front airbag 220 relative to the windshield 32 during the impact event. The protruded chambers 238 may be inflatable portions of the front airbag 220 extending toward the windshield 32 or may be separately connected (not shown). The protruded chambers 238 may be disposed at select points along the front airbag 220, or may extend the length of the front airbag 220.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A vehicle comprising:
   an instrument panel;
   a roof;
   a first side curtain airbag;
   a second side curtain airbag;
   two front seats disposed between the first side curtain airbag and the second side curtain airbag; and
   a front airbag supported by the roof extending from the first side curtain airbag to the second side curtain airbag between the instrument panel and the front seats;
   wherein the front airbag further includes a protruded chamber extending toward at least one of the front seats.

2. The vehicle of claim 1, further comprising a headliner with the front airbag extending from the headliner.

3. The vehicle of claim 2, wherein the first and second side curtain airbags extend from the headliner.

4. The vehicle of claim 2, further comprising an inflator disposed in the headliner.

5. The vehicle of claim 1, further comprising a steering wheel, wherein the front airbag extends between the steering wheel and the front seats.

6. The vehicle of claim 5, wherein the steering wheel is movable from a deployed position to a stowed position beneath the instrument panel, the front airbag extending between the steering wheel and the front seats in the deployed position.

7. The vehicle of claim 5, wherein the front airbag includes a bottom edge disposed beneath the steering wheel.

8. The vehicle of claim 5, wherein the front airbag includes a transparent panel adjacent to the steering wheel.

9. The vehicle of claim 1, further comprising a vehicle pillar and the front airbag includes an inflator disposed in the vehicle pillar.

10. The vehicle of claim 9, further comprising an impact sensor and a controller in communication with the inflator.

11. The vehicle of claim 1, further comprising a mechanism for selectively releasing the protruded chamber toward at least one of the front seats.

12. The vehicle of claim 1, wherein the first side curtain airbag includes an end proximal to the instrument panel, the front airbag extending between the end of the first side curtain airbag and the instrument panel.

13. The vehicle of claim 1, wherein the front airbag includes a bottom edge, the first side curtain airbag has an end proximal to the instrument panel, the second side curtain airbag has an end proximal to the instrument panel, and the bottom edge extends from the end of the first side curtain airbag to the end of the second side curtain airbag.

14. The vehicle of claim 1, further comprising a windshield and a steering wheel disposed between the windshield and the front airbag.

15. The vehicle of claim 14, wherein the front airbag further includes a protruded chamber extending toward the windshield.

16. A vehicle comprising:
a steering wheel;
a roof;
a headliner;
a first side curtain airbag extending from the headliner;
a second side curtain airbag extending from the headliner;
two front seats disposed between the first side curtain airbag and the second side curtain airbag; and
a front airbag supported by the roof extending from the headliner and extending from the first side curtain airbag to the second side curtain airbag between the steering wheel and the front seats;
wherein the front airbag includes a bottom edge disposed beneath a bottom edge of the steering wheel.

17. The vehicle of claim 16, further comprising an instrument panel, wherein the first airbag has an end proximal to the instrument panel the front airbag extending between the end of the first side curtain airbag and the instrument panel.

18. The vehicle of claim 16, wherein the front airbag further includes a protruded chamber extending toward at least one of the front seats.

19. A vehicle, comprising:
a roof;
a headliner supported by the roof;
a first side curtain airbag extending from the headliner;
a second side curtain airbag extending from the headliner;
a first front seat and a second front seat each disposed between the first and second side curtain airbags;
a first front airbag extending from the headliner adjacent the first side curtain airbag; and
a second front airbag extending from the headliner adjacent the second side curtain airbag;
wherein the first front airbag includes a protruded chamber extending toward the first front seat and the second front airbag includes a protruded chamber extending toward the second front seat.

20. A vehicle comprising:
an instrument panel;
a roof;
a first side curtain airbag;
a second side curtain airbag;
two front seats disposed between the first side curtain airbag and the second side curtain airbag;
a steering wheel; and
a front airbag supported by the roof extending from the first side curtain airbag to the second side curtain airbag between the instrument panel and the front seat;
wherein the front airbag extends between the steering wheel and the front seats and wherein the front airbag includes a transparent panel adjacent to the steering wheel.

* * * * *